July 13, 1965 R. F. ADAMS 3,194,309
HEAT EXCHANGE STRUCTURE
Original Filed July 16, 1954 3 Sheets-Sheet 1
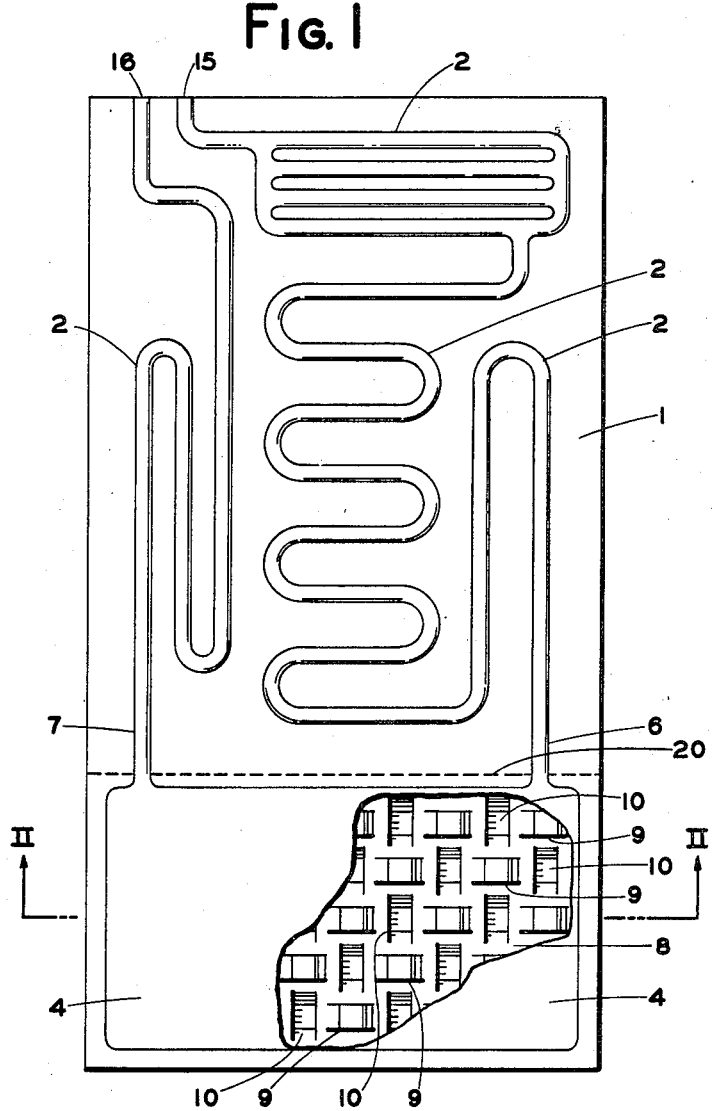
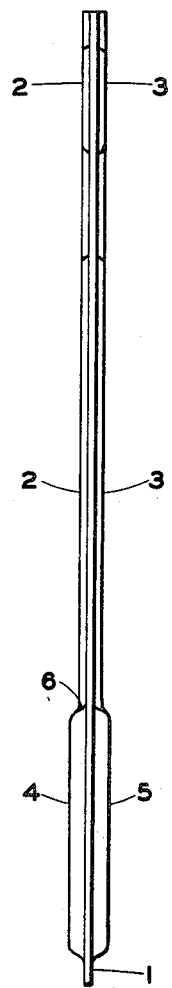
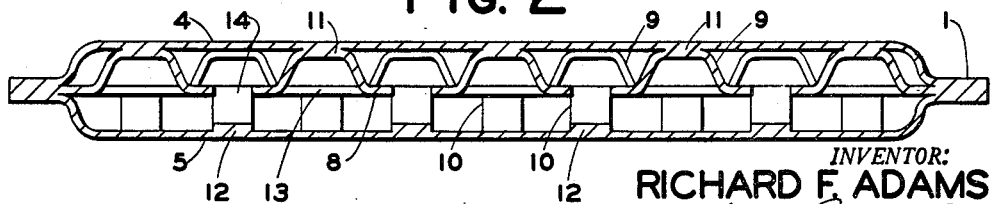
INVENTOR:
RICHARD F. ADAMS
BY
ATTORNEYS July 13, 1965  R. F. ADAMS  3,194,309
HEAT EXCHANGE STRUCTURE
Original Filed July 16, 1954  3 Sheets-Sheet 3

INVENTOR:
RICHARD F. ADAMS
BY
ATTORNEYS

United States Patent Office 3,194,309
Patented July 13, 1965

3,194,309
HEAT EXCHANGE STRUCTURE
Richard F. Adams, Alton, Ill., assignor to Olin Mathieson Chemical Corporation, a corporation of Virginia
Original application July 16, 1954, Ser. No. 443,944, now Patent No. 2,944,328, dated July 12, 1960. Divided and this application Oct. 12, 1959, Ser. No. 848,887
4 Claims. (Cl. 165—170)

This application is a division of copending application Serial No. 443,944, filed July 16, 1954, now U.S. Letters Patent No. 2,944,328 granted July 12, 1960.

This invention relates to sheet metal hollow structures and more particularly to sheet metal heat exchange units having relatively thin walls.

A method of making hollow articles of sheet metal substantially free from solder or brazing materials and without the use of electric welding has been developed. By this method as practiced in the manufacture of refrigerator evaporators, for example, a weld preventing material is applied in a definite, foreshortened, and rather complex pattern between two weldable sheets of metal after which the sheets are fixed in super-position and hot rolled to form a single inflatable sheet. Upon inflation there is erected from and within the sheet a system of passageways of predetermined dimensions and configuration. In this final passageway design it is frequently necessary to include a rather large cavity such as the header of a radiator or the boiler of a refrigerator evaporator. In the practice of the above-noted method, it is a problem to make satisfactory large volume cavities of rather flat shape as distinguished from long narrow passageways inasmuch as the sheet metal in the relatively thin walls of the extensive cavity or hollow is put to a greater pressure in tension than the walls of the narrow passageways; and, as a result, there is a tendency for the area around and including such headers or boilers to undergo excessive distortion or to burst.

To prevent distortion or bursting by high internal pressure, the prior art expedient of U.S. 1,712,085 (Litle) has been adapted to this method with only limited success. This involves application of a grid-like pattern which provides upon pressure welding a plurality of welded "islands" distributed throughout the boiler cavity. A serious disadvantage of this method of handling the problem is that the effective boiler volume is considerably reduced which necessitates provision of a larger area of boiler in the product than desirable and necessary. Another disadvantage is that the exterior of the boiler or accumulator is not smooth or substantially flat but is instead pock marked with a plurality of relatively steep walled depressions in which moisture and dirt will accumulate and from which the moisture and dirt are removable only with difficulty.

Therefore, one object of this invention is to provide a sheet metal heat exchanger unit pressure welding process having a large volume thin walled cavity. Another object to to provide in such a unit a large volume cavity capable of holding a relatively flat shape with a minimum of distortion under internal inflation or operating pressure. Another object is to provide such a heat exchange unit having a relatively flat thin walled large volume cavity of increased strength for containing fluids under high pressure without bursting. Another object is to provide a heat exchange unit with internal elements for improving the heat transfer characteristics of the unit. Another object of this invention is to provide a new and improved internal structure of the sheet metal units to enable expansion with or without the use of press platens at very high pressures and to enable high operating pressures after expansion without rupturing the metal. It is still another object of this invention to provide a new and improved heat exchange unit. Further objects and advantages of this invention will become apparent from the following description which will be better understood with reference to the accompanying drawing, in which:

FIGURE 1 is a plan view illustrating one embodiment of the invention with a part broken away to better illustrate the structural details involved;

FIGURE 2 is an enlarged elevational cross-sectional view taken on line II—II of FIGURE 1;

FIGURE 3 is an elevational side view of the embodiment of FIGURE 1;

Figure 4:
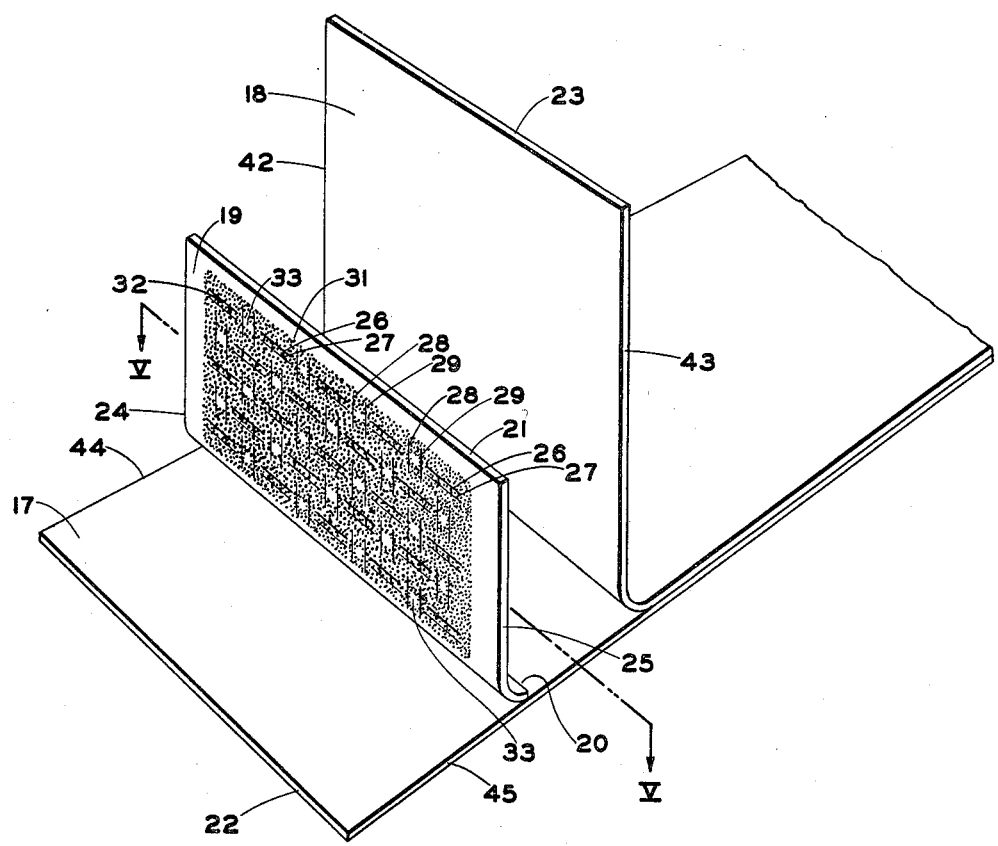
FIGURE 4 is a fragmentary perspective view with the sheets partially peeled and extended showing the structural details, manner of assembly and relationship of the component sheets used to make the hollow article of FIGURE 1 in accordance with this invention prior to pressure welding by rolling and forming by inflation.

In accordance with this invention there is provided a single sheet of metal embracing within the body of the metal intermediate the parallel or flat faces thereof embryonic fluid passageways including a potential generally flat shaped cavity of rather large expanse which upon fluid inflation of the sheet develops a large volume recess the opposite walls of which are connected by a series of stay straps of sheet metal. Upon inflation of the single sheet there is provided in accordance with this invention a hollow sheet metal structure having a relatively flat thin walled voluminous cavity of large area relative to the sheet and with an internal sheet metal structure for reinforcing the cavity walls against excessive distortion or bursting which might be caused by the pressure of any fluid in the cavity. The internal sheet structure is adapted to adhere to the external walls of the sheet alternately and is mechanically weakened to facilitate opening and expansion of the internal sheet to form internal straps.

To make the aforementioned new and improved hollow sheet metal units in accordance with the pressure welding method of this invention there is provided in the area of the desired boiler or header cavity a special new assembly of component layers of weldable sheets, including an expandable slitted or at least mechanically weakened interleaved sheet and weld preventing material, next this assembly is secured as a preliminary to welding to prevent relative slippage between layers and the assembly thus secured is subjected to a single hot working as by rolling to a sufficient metal reduction to unite each of the "outside" sheet metal components at spaced points alternately with the interleaved sheet except where the elongated weld preventing material is interfacially continuously disposed. The special new assembly of components consists of at least two "outer" weldable sheets of metal, at least one intermediate sheet of weldable metal and at least between each of these outside sheet metal components and the adjacent intermediate sheet a layer of weld preventing material in a foreshortened grid-like open pattern. The periphery of each elongated pattern substantially coincides in superposition with the periphery of the internally reinforced extensive boiler or header cavity desired; but the so-called "openings" or "islands" of each pattern, at which welding between adjacent sheet metal components occurs, are staggered with respect to the "openings" of the adjacent pattern. By "openings" or "islands" of the grid pattern is meant the areas free from weld preventing material such as graphite.

According to one aspect of this invention there may be provided between two weldable sheets of metal in at least and entirely across the area of the assembly where partial welding is desired and where a boiler or header cavity is to be erected by inflation, one intermediate slitted, incised or otherwise suitably weakened sheet of weldable metal to the opposite faces of which weld preventing material may be applied in a solid pattern except for a plurality of laterally and longitudinally spaced areas free from weld preventing material and which never overlap with the weld-preventing-material-free areas of the other side of the intermediate sheet. While it is preferred that the intermediate sheet be incised or slit between the spaced areas or pattern "openings" free from weld preventing material, the incisions need not extend entirely through the sheet. By incisions is meant any mechanical weakening which will facilitate expansion of the intermediate sheet to form an open internal strap structure.

One pattern of weld preventing material with spaced islands free from such material may be applied to the inner face of one of the two outside component sheets of metal while the other pattern is applied to the inner face of the other of the two outside sheets, instead of being applied to the intermediate sheet. In application of the patterns by either mode it is only necessary that the weldable islands of one pattern be offset from and not overlap with the islands of the other pattern. A regular pattern of spaced incisions or slits through or nearly completely through the intermediate sheet or sheets permits a larger over-all expansion of the boiler or header cavity and tends materially to reduce the lateral contraction and distortion of the finished sheet metal unit which may otherwise accompany the process during the inflation step especially in the area containing the large cavity.

A heat exchange unit in accordance with a preferred embodiment illustrative of the invention is shown in FIGURES 1, 2 and 3 of the drawing. The unit is fabricated as a single sheet metal plate 1 having erected from a stratum of weld preventing material in its interior a system of fluid passageways by fluid pressure inflation. The system consists, in general, of relatively narrow, long passageways delineated by the walls 2 and 3 protruding out of the plane of plate 1 and the relatively wide voluminous accumulator or boiler delineated by walls 4 and 5 also erected by inflation to protrude out of the plane of plate 1. Edge openings 15 and 16 form the inlet and outlet of the conduit system. The narrow passageways include an entrance connection 6 and a discharge connection 7 for the boiler cavity between the boiler walls 4 and 5 which are more separated by fluid pressure inflation than walls 2 and 3 in order to obtain a larger volume in series with the passageways. It is to be understood that the flat-like boiler of relatively large expanse, as compared to any one of the narrow passageways, may be inflated to the same height as the passageways. In any event, the boiler walls 4 and 5 are internally braced by stays 9 and 10 carried by the inner or interleaved sheet 8. Stays 9 are welded integrally with boiler wall 4 and stays 10 in turn are welded integrally with boiler wall 5, all without the use of solder or brazing material of any kind whatsoever. Stays 9, for instance, are joined to wall 4 at points 11 by a pressure weld. Similarly, stays 10 are joined or welded at points 12 to wall 5 by a type of joint which has a strength at least as great as that of the parent metal of the stays and walls. However the boiler is not divided into two separate cavities by the intermediate sheet since it is provided with perforations 13 at the places where stays 9 have been raised out of the sheet 8 and also perforations 14 at the places where stays 10 have been depressed out of sheet 8 by the inflation operation. The internal structure between outer walls 4 and 5 of the boiler is shown best in FIGURE 2 and at the part of outer wall 4 broken away in FIGURE 1.

It will be noted that the pressure welded large volume cavity defined by walls 4 and 5 is of a construction which enables walls 4 and 5 to be erected by inflation to a more nearly flat configuration even without the aid of confinement between flat faced spaced press platens and at higher inflation fluid pressures with less danger of rupture. Furthermore, this construction provides stay members 9 and 10 for holding boiler walls 4 and 5 in position without undue interference with fluid circulation within the cavity. In fact, the stay structure, consisting of members 8, 9 and 10, assist not only in retaining the outer walls 4 and 5 under high operating internal pressure but also in improving the heat transfer characteristics of the cavity structure. Another advantage of this structure is that on account of the open framework which remains from intermediate sheet 8 after stays 9 and 10 have been lifted out of it, there is less contraction and resultant distortion in the plate 1 at the large cavity at walls 4 and 5. As can be readily seen this construction provides a unit having a series of three portions of the inner sheet 8 disposed in different parts and spaced relationship. For example, the above identified open framework which is formed from intermediate sheet 8, constitutes a first portion of the sheet retained in the original plane thereof whereas in other parts of this sheet a second portion is lifted out into stay 9 to project out of one face of this inner sheet 8, and in addition a third portion of sheet 8 is lifted out of it into stay 10 which projects from the opposite face of this inner sheet 8. As a result this inner sheet is comprised of a plurality of loops which project from opposite sides of this member with the crest of each of the loops integrated, as by welding, with one of the walls 4 and 5 adjacent thereto. Manufacture of a sheet metal unit in accordance with this invention will be described in connection with FIGURES 4 and 5.

The sheet metal unit is made of component sheets 17, 18 and 19 as shown in FIGURE 4 in peeled-back position at one end, the better to illustrate the details of construction. Outer sheets 17 and 18 are placed together in superposition and in contact except where interleaved sheet 19 is placed between them also in superposed relationship. All three of the sheets 17, 18 and 19, thus superposed, are fastened together in any suitable manner as by means of a pair of spot welds, each one of which is located near the lateral edges of the preliminary assembly so as to prevent sliding or slipping action between the component sheets. Thus arranged, the assembly of fastened components is heated to a suitable rolling temperature and then delivered to a rolling mill for suitable reduction for the accomplishment of a pressure weld between the sheets except at those interfacial areas where a weld preventing material such as colloidal graphite has been applied in accordance with a foreshortened pattern which upon rolling is elongated to predetermined dimensions. The pressure welded plate formed by this procedure is then subjected, usually after annealing, to inflation by fluid pressure in order to erect from the body of the single plate fluid passageways in accordance with a predetermined design as delineated by the position and dimensions of the pattern of elongated weld preventing material.

To construct the large volume cavity by this process in accordance with this invention, there is inserted between outer sheets 17 and 18 an intermediate sheet 19 having a plurality of incisions in the form and arrangement shown. The incisions consist of a series of parallel paired incisions 26 and 27 extending transversely to the rolling direction and a series of parallel paired incisions 28 and 29 extending at right angles to incisions 26 and 27 longitudinally in the rolling direction. But it is to be understood that all the incisions may extend at an angle such as 45° with the rolling direction. Pairs 26 and 27 and pairs 28 and 29 are arranged in rows and columns in sheet 19; and pairs 26 and 27 alternate with pairs 28 and 29 in either direction. The arrangement of slits is disposed in sheet 19 inwardly from the edges 20, 21, 24 and 25. Sheet 19 also carries weld preventing material applied in a layer 30 to one of the faces to be juxtaposed adjacent to outer sheet 18 and also weld preventing material in layer 31 applied to the opposite face to be juxtaposed adjacent outer sheet 17.

Figure 5:
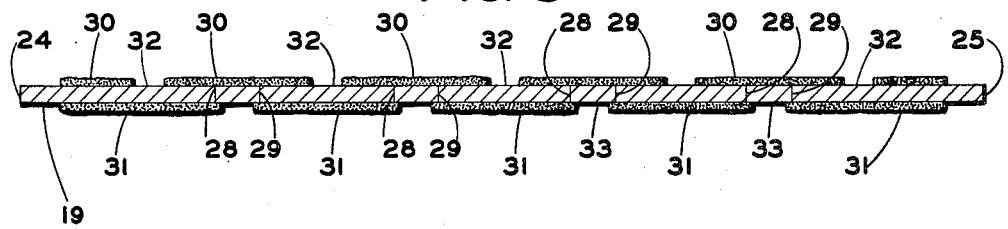
FIGURE 5 is a cross-sectional view taken on line V—V of FIGURE 4 through intermediate sheet 19.

Each layer of weld preventing material, which may consist of any suitable composition and preferably one containing colloidal graphite, is applied in a pattern characterized by "openings" or "islands" free from weld preventing material. In layer 30 the "islands" 32 occur at the midsection between each pair of incisions 26 and 27 preferably spaced inwardly from the incisions, as is shown in FIGURE 5. In layer 31 the "islands" 33 occur at the midsection between each pair of incisions 28 and 29, preferably spaced inwardly from the incisions. This pattern of weld preventing material permits sheet 19 after passage through the pressure welding rolls to be welded to outer sheet 18 at the "islands" 32. Similarly upon passage through the pressure welding rolls, sheet 19 is welded to outer sheet 17 at the "islands" 33. Inasmuch as peripheral areas of sheet 19 along its edges 20, 21, 24 and 25, except for the entrance and discharge portions 6 and 7, are free from weld preventing material, pressure welding produces in the embryonic large cavity section, as defined by sheets 17, 18 and 19, a large internal parted area at which welding does not occur except at the relatively small "islands" 32 and 33. As is evident from FIGURE 5, these "islands" are arranged in rows and columns laterally and longitudinally spaced so the areas 32 on one side of the intermediate sheet 19 do not overlap with the areas 33 on the other side.

In accordance with the degree of reduction by rolling required, the dimension of intermediate sheet 19 between edges 20 and 21 is foreshortened and similarly the distance between incisions 26 and 27 is foreshortened as compared with the separation between incisions 28 and 29. As a result of foreshortening, the length of incisions 28 and 29 is initially and correspondingly less than the length of incisions 26 and 27. To avoid distortion in the form of buckling and rippling, lateral edges 45, 25 and 43 of sheets 17, 19 and 18, respectively, are in coincidence and similarly, lateral edges 44, 24 and 42 of sheets 17, 19 and 18, respectively, are in coincidence.

It will be understood that where the roll spacing of the rolling mill is fixed the amount of reduction at the three layer portion of the assembly will be greater than the amount of reduction at the two layer portion. However, if desired, the roll separation or bight may be adjusted so as to give a substantially uniform degree of metal reduction over the entire sheet metal unit to leave a thickened portion at the three layer boiler part of the sheet metal unit. This latter procedure provides the added advantage of thickened boiler walls 4 and 5. Where the roll spacing is fixed there is obtained in the boiler area the advantage of more severely worked metal amenable to softening by annealing more quickly and completely at lower temperatures. This provides metal, such as walls 4 and 5, more easily inflated in the boiler area than in the other areas. With such working and with the strap structure herein described, inflation to final form can be done without confinement in a die or press. Alternately, inflation may occur with confinement between dies or flat face platens only in the boiler area while the narrow work hardened passageways may be inflated free without any need for their walls 2 and 3, FIGURES 1 and 3, to be in contact with the more widely spaced die faces contacting boiler walls 4 and 5. Other variations of the rolling and inflation procedures may suggest themselves to those skilled in the art.

Figure 6:
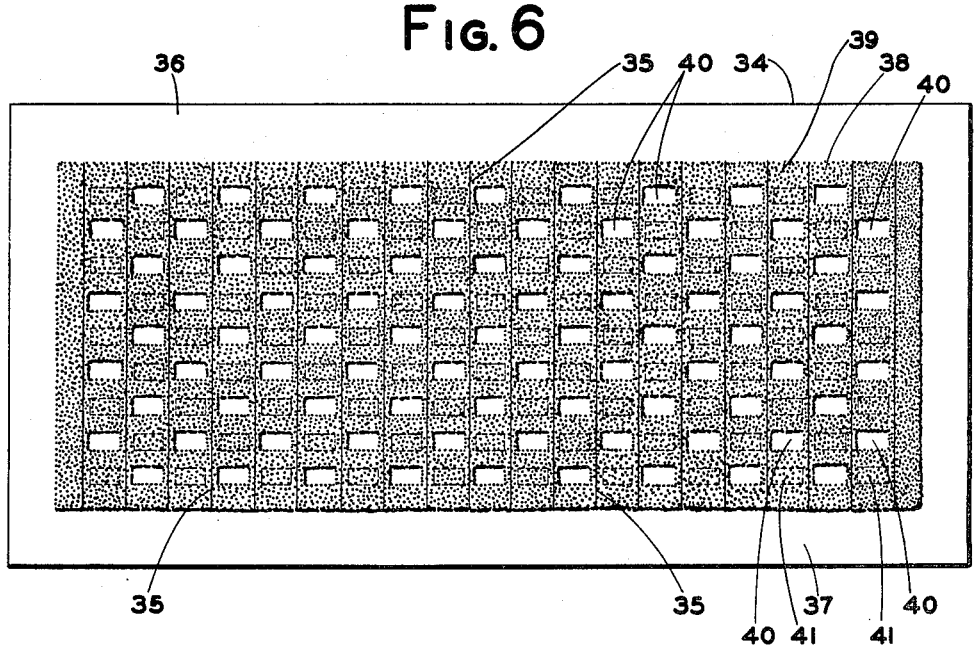
FIGURE 6 is a plan view of a modification of the intermediate sheet structure.

In the modified intermediate sheet 34 shown in FIGURE 6, incisions 35 run parallel to each other across the width of the sheet and extend in the direction of rolling terminating short of the leading and trailing edges so as to leave marginal connecting portion 36 at the leading edge and marginal connecting portion 37 at the trailing edge inwardly from the periphery of sheet 34. Each face is then coated with a longitudinally foreshortened pattern of weld preventing material such as layer 38 on the top face and layer 39 on the bottom face. Weld preventing layers 38 and 39 are in coincidence and identical except for the "islands" 40 and 41 free from weld preventing material. The weld preventing material free areas 40 of the top layer 38 alternate and do not overlap with the weld preventing material free areas 41 of the bottom layer 39. It is evident that with sheet 34 interposed between outside component sheets 17 and 18 in the proposed boiler in lieu of sheet 19 of FIGURE 4, pressure welding by rolling will cause weld preventing material free areas 40 to integrate with one of the outside component sheets while weld preventing material free areas 41 integrate with the other outside sheet. Upon injection of inflation pressure to the interior of the resultant pressure welded sheet metal unit there is formed a system of stays within the boiler of a form having a different configuration than that shown in FIGURE 2 but otherwise similar in principle.

The intermediate or interleaved sheet may be thicker or thinner than the outside component sheets. It is also to be understood that the intermediate sheet may be coextensive with the outside component sheets particularly where the large volume cavity takes up the greater part of the area of the sheet metal unit. It is also quite obvious that the layers of weld preventing material may be applied to the outside sheets rather than to the intermediate sheets.

It will be appreciated that by means of this invention there is provided a heat exchange element or other hollow sheet metal unit having a thin-walled cavity of large fluid capacity reduced only slightly by the presence of the internal straps. These serve as heat transfer elements and also as stay bars or straps for preventing excessive outward distortion of the walls of said cavity under high internal pressure of a working fluid medium. These internal straps are cold worked by the inflation operation and are thereby strengthened.

Since many other embodiments of this invention may occur to those skilled in the art, it is to be understood the foregoing is intended by way of illustration of a preferred embodiment and not as a limitation of the scope of the present invention except as set forth in the appended claims.

What I claim is:

1. In a sheet metal unit, a voluminous thin-walled cavity of large expanse defined between substantially superposed planar outer wall members disposed in spaced relationship to each other, and a single inner wall member subdividing said cavity and welded to said outer wall members along spaced marginal portions of the adjacent faces of all said members, said inner wall member being coextensive with said outer wall members between said marginal portions and disposed between and partially lying in a plane in spaced relationship to said outer wall members with said inner wall member having between said marginal portions a first portion, a second portion, and a third portion disposed in different parts of said inner wall member, with all of said first portion comprising a first perforation through said member and a first strip of said inner wall member bowed out therefrom in superposed relationship with said first perforation and extending as a first loop projecting out from one of the opposite faces of said inner wall member with the crest of said first loop integrated with one of said outer wall members adjacent said one face, said second portion being spaced from said first portion and comprising a second perforation through said member and a second strip of said inner wall member bowed out in superposed relationship with said second perforation and extending as a second loop projecting out from the other of said faces with the crest of said second loop integrated with the other of said outer wall members adjacent said other face, and said third portion disposed in the normal plane of said inner wall member in its spaced relationship with said members.

2. In a sheet metal pressure welded unit a voluminous thin-walled cavity of large expanse defined between substantially superposed planar outer wall members disposed in spaced relationship to each other and a single inner wall member subdividing said cavity and welded to said outer wall members along spaced marginal portions of the adjacent faces of all said members, said inner wall member being coextensive with said outer wall members between said marginal portions and disposed between and partially lying in a plane in spaced relationship to said outer wall members with said inner wall member having between said marginal portions a first portion, a second portion, and a third portion, disposed in different parts of said inner wall member, with all of said first portion comprised of a strip of said inner wall member projecting from out of one of the opposite faces of said inner wall as a loop with the crest of said loop integrated with the outer wall member adjacent said one face, said second portion spaced from said first portion and comprising a second strip of metal projecting as a loop from the other of said opposite faces with the crest of the last said loop integrated with the other of said outer wall members adjacent said other face, and said third portion disposed in the normal plane of said inner wall member in its spaced relationship with said members.

3. In an integrated sheet metal unit, a voluminous thin walled cavity of large expanse defined between outer wall members disposed in spaced relationship with each other, a single inner wall subdividing said cavity and welded along spaced marginal portions of each of its faces to an adjacent outer wall member, said inner wall between said marginal portions being co-extensive with said wall members and partially lying in a plane in spaced relationship to said wall members with said inner wall comprised of a first portion, a second portion and a third portion disposed in different parts of said inner wall with all of said first portion comprising a first perforation through said inner wall and a first loop of said inner wall disposed in superposed relationship with said first perforation and projecting out from one of the opposite faces of said inner wall with the crest of said strip integrated with one of said wall members adjacent said one face, said second portion being spaced from said first portion and comprising a second perforation through said inner wall and a second loop of said inner wall disposed in superposed relationship with said second perforation and projecting out of the other of said faces with the crest of said second loop integrated with the other of said wall members, and said third portion disposed in the normal plane of said inner wall in its said spaced relationship with said wall members.

4. An integrated sheet metal unit comprised of two superposed and spaced outer wall members and a single inner wall member disposed between and partially lying in a plane in spaced relationship to said members with said member having portions thereof partially severed and bowed out of the plane of said member into loops projecting from opposite sides of said member with the crest of one of said loops which projects out of the opposite faces of said member integrated with one of said members adjacent said one face and with the crest of a second of said loops which projects out of the other of said faces integrated to the other of said members adjacent said other face, all of said first loops having a longitudinal extent in a first direction and all of said second loops having a longitudinal extent in a second direction which is substantially perpendicular to said first direction, and a portion of said member remaining in the normal plane of said member in its spaced relationship from said members and integrally connected with said first and second loops.

References Cited by the Examiner

UNITED STATES PATENTS

| | | | |
|---|---|---|---|
| 514,313 | 2/94 | Eckstein | 29—163.5 |
| 1,896,286 | 2/33 | Burns et al. | 29—163.5 |
| 1,840,318 | 1/32 | Horvath | 165—153 |
| 1,984,653 | 12/34 | Palmer et al. | 29—163.5 |
| 2,212,481 | 8/40 | Sendzimer | 29—188 |
| 2,752,128 | 6/56 | Dedo | 165—155 |
| 2,766,514 | 10/56 | Adams | 29—157.3 |
| 2,922,344 | 1/60 | Meissner | 29—157.3 |

CHARLES SUKALO, *Primary Examiner.*

HERMAN BERMAN, HERBERT L. MARTIN, PERCY L. PATRICK, *Examiners.*